(12) United States Patent
Koyama et al.

(10) Patent No.: US 11,068,151 B2
(45) Date of Patent: *Jul. 20, 2021

(54) CONTENT DISPLAY DEVICE, CONTENT DISPLAY METHOD AND PROGRAM

(71) Applicant: Sharp Kabushiki Kaisha, Osaka (JP)

(72) Inventors: Noriyuki Koyama, Osaka (JP); Satoshi Terada, Osaka (JP); Kazunori Urano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,033

(22) Filed: Mar. 9, 2020

(65) Prior Publication Data

US 2020/0210040 A1 Jul. 2, 2020

Related U.S. Application Data

(63) Continuation of application No. 15/050,961, filed on Feb. 23, 2016, now Pat. No. 10,620,818.

(30) Foreign Application Priority Data

Jun. 26, 2015 (JP) .................................. 2015-128345

(51) Int. Cl.
*G06F 3/0488* (2013.01)

(52) U.S. Cl.
CPC .. *G06F 3/0488* (2013.01); *G06F 2203/04808* (2013.01)

(58) Field of Classification Search
CPC .. G06F 3/0488; G06F 3/044; G06F 2203/041; G06F 2203/04104; G06F 2203/04808

USPC ......... 345/156–184, 650, 676, 684; 715/716, 715/741, 780, 823; 710/17; 239/239
See application file for complete search history.

(56) References Cited

U.S. PATENT DOCUMENTS

| | | |
|---|---|---|
| 7,737,993 B2 | 6/2010 | Kaasila |
| 8,610,678 B2 | 12/2013 | Ikeda |
| 9,293,112 B2 | 3/2016 | Kim |
| 9,342,148 B2 | 5/2016 | Koga |
| 9,858,356 B1 | 1/2018 | Johnson |

(Continued)

FOREIGN PATENT DOCUMENTS

| | | |
|---|---|---|
| CN | 103945052 A | 7/2014 |
| JP | 8-137653 A | 5/1996 |

(Continued)

OTHER PUBLICATIONS

Allowed Claims from Parent U.S. Appl. No. 15/050,961.

*Primary Examiner* — Prabodh M Dharia
(74) *Attorney, Agent, or Firm* — Renner, Otto, Boisselle & Sklar, LLP

(57) ABSTRACT

A content display device includes: a display unit for displaying a content in a displayable area; a position detecting unit for detecting a touch position; a determination unit for determining whether or not the detected touch position is on the displayed content; and, a content movement control unit that, when the determination unit has determined that the detected touch position is on the displayed content while part of the content resides outside the displayable area of the display unit, performs a control so as to move and display the content in such a manner that an entire content is displayed within the displayable area.

10 Claims, 12 Drawing Sheets

(56) References Cited

U.S. PATENT DOCUMENTS

| | | |
|---|---|---|
| 10,019,140 B1 | 7/2018 | Bell |
| 10,620,818 B2* | 4/2020 | Koyama ............... G06F 3/0488 |
| 2004/0044574 A1 | 3/2004 | Cochran |
| 2008/0122796 A1 | 5/2008 | Jobs |
| 2008/0165148 A1 | 7/2008 | Williamson |
| 2009/0244016 A1 | 10/2009 | Casparian |
| 2010/0188352 A1 | 7/2010 | Ikeda |
| 2011/0037725 A1 | 2/2011 | Pryor |
| 2011/0148767 A1* | 6/2011 | Kong .................. G06F 40/232 |
| | | 345/168 |
| 2011/0157029 A1* | 6/2011 | Tseng ................. G06F 3/04883 |
| | | 345/173 |
| 2011/0260997 A1 | 10/2011 | Ozaki |
| 2012/0032979 A1 | 2/2012 | Blow |
| 2012/0044251 A1 | 2/2012 | Mark |
| 2012/0054674 A1 | 3/2012 | Beykpour |
| 2012/0062602 A1 | 3/2012 | Vadhavana |
| 2012/0174025 A1 | 7/2012 | SanGiovanni |
| 2012/0306772 A1* | 12/2012 | Tan .................... G06F 3/04842 |
| | | 345/173 |
| 2013/0139074 A1 | 5/2013 | Ozaki |
| 2013/0154975 A1 | 6/2013 | Han |
| 2013/0326398 A1 | 12/2013 | Zuverink |
| 2014/0098188 A1 | 4/2014 | Kwak |
| 2014/0176455 A1 | 6/2014 | Araki |
| 2014/0181734 A1 | 6/2014 | Jin |
| 2014/0204040 A1 | 7/2014 | Kim |
| 2014/0267103 A1* | 9/2014 | Chaudhri ............. G06F 3/0482 |
| | | 345/173 |
| 2014/0293092 A1 | 10/2014 | Sekine |
| 2015/0002424 A1 | 1/2015 | Yamamoto |
| 2015/0142875 A1 | 5/2015 | Gillard |
| 2015/0143421 A1 | 5/2015 | Williams |
| 2015/0253928 A1 | 9/2015 | Yamanaka |
| 2015/0268810 A1 | 9/2015 | Hoshino |
| 2015/0362998 A1 | 12/2015 | Park |
| 2015/0365720 A1 | 12/2015 | Hoffert |
| 2015/0370529 A1 | 12/2015 | Zambetti |
| 2015/0378503 A1 | 12/2015 | Seo |
| 2016/0004389 A1 | 1/2016 | Iwatsuki |
| 2016/0026371 A1 | 1/2016 | Lu |
| 2016/0062540 A1 | 3/2016 | Yang |
| 2016/0196049 A1* | 7/2016 | Iwatsuki ............. G06F 3/04845 |
| | | 715/817 |
| 2016/0296844 A1 | 10/2016 | Chiu |
| 2017/0177926 A1 | 6/2017 | Takayama |
| 2020/0122855 A1* | 4/2020 | Conaway ............. B64D 45/00 |

FOREIGN PATENT DOCUMENTS

| | | |
|---|---|---|
| JP | 11-353084 A | 12/1999 |
| JP | 2000-267783 A | 9/2000 |
| JP | 2006-251465 A | 9/2006 |
| JP | 2010-129051 A | 6/2010 |
| JP | 2010-176332 A | 8/2010 |
| JP | 2011-227821 A | 11/2011 |
| JP | 2014-178882 A | 9/2014 |

* cited by examiner

CONTENT DISPLAY DEVICE, CONTENT DISPLAY METHOD AND PROGRAM

This Nonprovisional application is a continuation under 35 USC § 120 of U.S. patent application Ser. No. 15/050,961 filed on Feb. 23, 2016, which claims priority under 35 U.S.C. § 119(a) to Patent Application No. 2015-128345 filed in Japan on Jun. 26, 2015, the entire contents of which are hereby incorporated by reference.

BACKGROUND OF THE INVENTION

(1) Field of the Invention

The present invention relates to a content display device and the like.

(2) Description of the Prior Art

There have been conventionally known techniques of displaying one or a plurality of contents on a display screen in a movable manner using windows or the like.

Recently, in order to enlarge the displayable area that can display contents, techniques of using a plurality of display screens arranged side by side or in other ways have been known. In this case, ordinary display screen has a housing bezel, hence the visibility of contents is degraded when the contents are displayed across the display screens.

To deal with this, for example, in multi-display technique, there have been disclosures of inventions whereby the visibility and operativity of the users are improved by avoiding the windows being displayed across multiple displays as much as possible (for example, see Patent Document 1).

RELATED ART DOCUMENTS

Patent Documents

[Patent Document 1]
Japanese Patent Application Laid-open 2006-251465

Problems to be Solved by the Invention

For example, there are cases where a content is displayed beyond the displayable area even with a single screen. In this case, when the operation buttons of the window that is displaying the content are located on the right side, the right side part is positioned out of sight from the displayable area, causing a problem it becomes impossible to perform the operation.

Further, in a case of multi-display, there conventionally occurs the problem that when the user wants to temporarily put aside a window that is being displayed in one of the displays but keep in the same display, the window automatically jumps into another display. Further, depending on the moved area of a content, it sometimes happens that the content window is forcibly moved back regardless of user's intention. Thus, there sometimes occurred problems that the operation intended by the user cannot be well achieved.

SUMMARY OF THE INVENTION

In view of the above problems, it is therefore an object of the present invention to provide a content display device and the like that enable even a content that is being displayed spreading beyond a displayable area or being displayed across multiple displayable areas, to be moved and displayed in a pertinent position in an easy method.

Means for Solving the Problems

In view of the above problems, a content display device of the present invention includes:
a display unit for displaying a content in a displayable area;
a position detecting unit for detecting a touch position;
a determination unit for determining whether or not the detected touch position is on the displayed content; and,
a content movement control unit that, when the determination unit has determined that the detected touch position is on the displayed content while part of the content resides outside the displayable area of the display unit, performs a control so as to move and display the content in such a manner that an entire content is displayed within the displayable area.

A content display method of the present invention includes the steps of:
displaying a content in a displayable area;
detecting a touch position;
determining whether or not the detected touch position is on the displayed content; and,
when, in the determining, determined that the detected touch position is on the displayed content while part of the content resides outside the displayable area of a display unit, moving and displaying the content in such a manner that an entire content is displayed within the displayable area.

A program of the present invention causes a computer to realize:
a display function for displaying a content in a displayable area;
a position detecting function for detecting a touch position;
a determination function for determining whether or not the detected touch position is on the displayed content; and,
a content movement control function that, when the determination function has determined that the detected touch position is on the displayed content while part of the content resides outside the displayable area of a display unit, performs a control so as to move and display the content in such a manner that an entire content is displayed within the displayable area.

Advantages of the Invention

According to the present invention, when the position touched by the user is located on the displayed content and part of the content extends outside the displayable area of the display unit, it is possible to control movement and display of the content so that the entire content is displayed within the displayable area. Accordingly, the entire content can be displayed at a pertinent position at the timing the user intends.

DESCRIPTION OF THE PREFERRED EMBODIMENTS

Now, the best mode for carrying out the present invention will be described with reference to the drawings. Here, for description convenience, description will be made on exemplary embodiments, but it goes without saying that the invention can be applied to any apparatus as long as is a device that can display contents.

1. The First Embodiment 1.1 Overall Configuration

Figure 1:
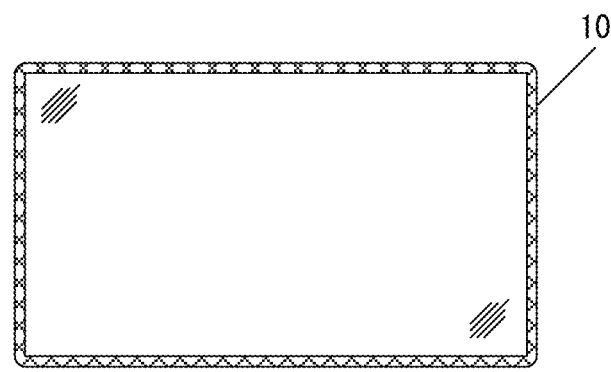
FIG. 1 is an overall appearance view of the first embodiment.

To begin with, FIG. 1 shows the external appearance of a display device 10 to which a content display device of the present invention is applied. The display device 10 is a display device such as a liquid crystal display and is formed with a touch screen that enables input by touching.

In this case, the touch panel can receive an operation input such as touch, flick, slide and others from the user. As the method of detecting touch and other input, a touch panel of a static capacitive type or a touch panel of a pressure sensitive type may be used. That is, the touch panel may have any device configuration as long as it can correctly receive user's operation input such as touch and the like.

The display device 10 is not limited to, for example, general touch panel displays but may be a device such as a computer, tablet terminal, smartphone, and car navigation and the like.

1.2 Functional Configuration

Figure 2:
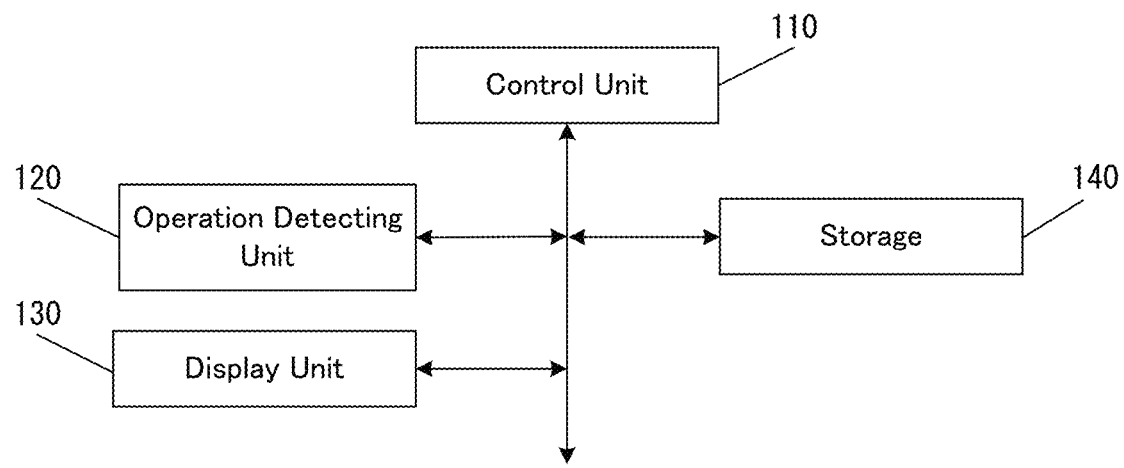
FIG. 2 is a diagram for illustrating the functional configuration of a display device of the first embodiment.

Next, the functional configuration of the display device 10 in the present embodiment will be described with reference to FIG. 2. As shown in FIG. 2, the display device 10 includes a control unit 110, an operation detecting unit 120, a display unit 130 and a storage 140.

The control unit 110 is a functional unit for controlling the whole of the display device 10. The control unit 110 realizes diverse kinds of functions by loading and running various programs stored in the storage 140, and can be configured of, for example, a CPU (Central Processing Unit) and others.

The operation detecting unit 120 is a functional unit for detecting operations from the user. For example, this unit can be configured of a touch panel etc. As the mechanism of detecting operations, any method can be used such as a pressure-sensitive method such as a resistive film method, a static capacitive method, an electromagnetic induction method, an infrared method and others.

The display unit 130 is a functional unit for displaying various pieces of information and contents to the user, and may be comprised of, for example a liquid crystal display (LCD), organic EL display or the like.

The storage 140 is a functional unit for storing necessary various programs and various data for operating the display device 10. The storage 140 can be comprised of, for example, semiconductor memories, HDDs (Hard Disk Drives) and others.

Contents are also stored in the storage 140 so that some of them can be selected and displayed on the display unit 130. For this, the storage 140 also stores the coordinates for each content and the coordinates of a displayable area.

Here, in the present embodiment, the display device 10 performs both display and control but, control may be performed by another device. For example, control may be performed by a computer that is connected to a display device capable of detecting touch, via USB (Universal Serial Bus)/HDMI (High-Definition Multimedia Interface) or the like.

1.3 Processing Flow

Figure 3:
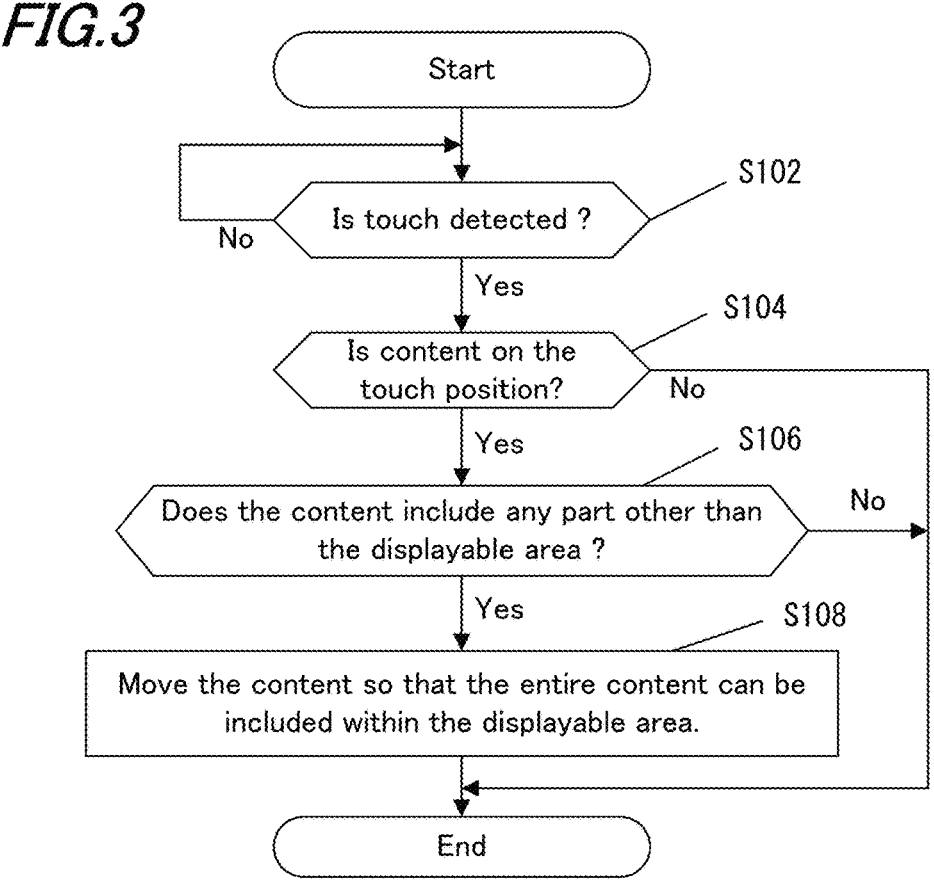
FIG. 3 is a chart for illustrating the processing flow in the first embodiment.

Next, the processing flow in this embodiment will be described with reference to FIG. 3. To begin with, when a touch to display unit 130 is detected (Step S102), it is determined whether any content is being displayed at the touch position (coordinates) on the display unit 130 (Step S104).

In this case, a content is being displayed at the touch position, and it is determined whether or not the content is also displayed beyond the displayable area of the display unit 130 (Step S106). If the content is also displayed beyond the displayable area, the content is moved so that the whole of a display area of the content displayed in one screen can be included in the displayable area of the display unit 130 (Step S106; Yes→Step S108).

Now, one example of the process of moving a content so that the whole of the display area of the content is included in the displayable area will be explained. Here, any other moving method can be used as long as the content is moved (re-displayed) so that the entire display area of the content residing at the touch position can be included in the displayable area.

Figure 4:
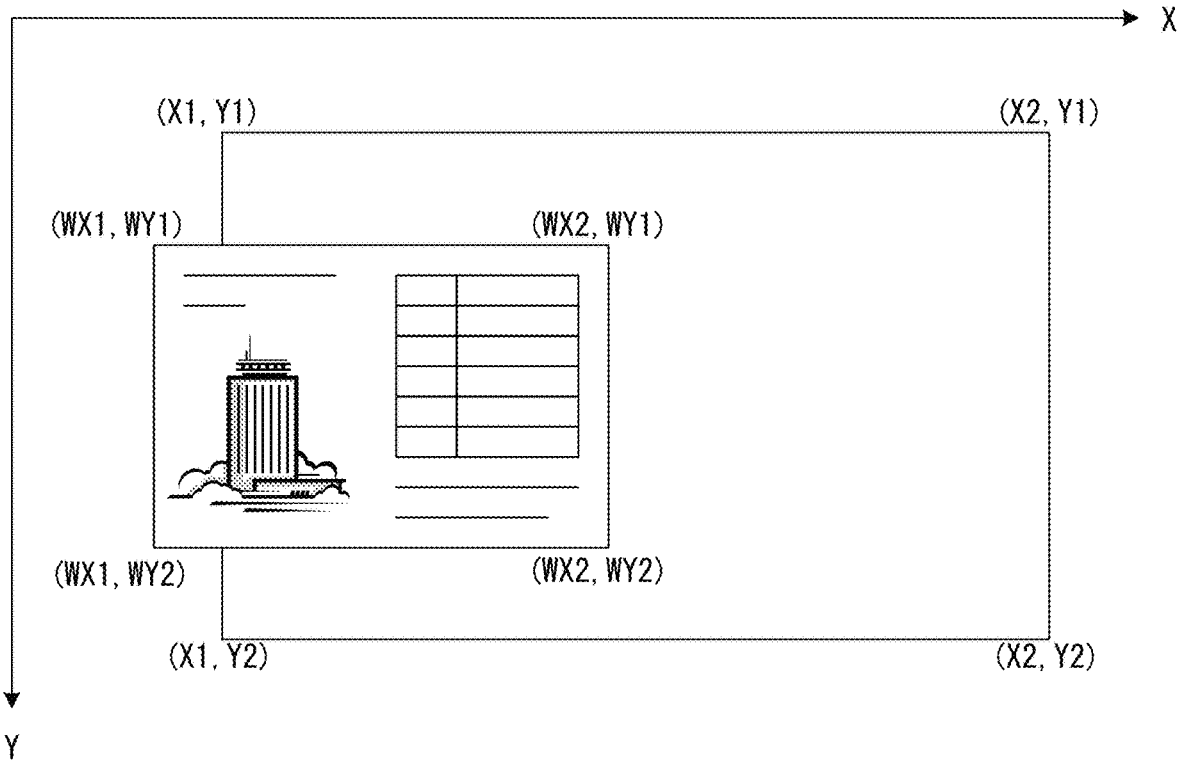
FIG. 4 is a diagram for illustrating coordinates in the first embodiment.

Referring first to FIG. 4, the display coordinates will be described. As the coordinates representing the area that can be displayed by the display unit 130 (the displayable area), a frame designated by (X1, Y1)-(X2, Y2) is configured.

In this case, the area of a content (content displayed area) is displayed in a position designated by (WX1, WY1)-(WX2, WY2). By comparing the content displayed area with the displayable area, the display of the content is moved so that the entire content can be included in the displayable area.

Here, in the example shown in FIG. 4, of the content the area of (WX1, WY1)-(X1, WY2) is located outside the displayable area, so that this area is, in fact, not displayed on the display unit 130. That is, FIG. 4 virtually shows the whole of the content, but the user cannot visually recognize the part of the content located outside the displayable area.

In the description of the embodiment, displaying a content denotes display of the whole content on the area including the part outside the displayable area, which is not actually displayed on the display unit 130 but is assumed to be displayed in the victual area.

Figure 5:
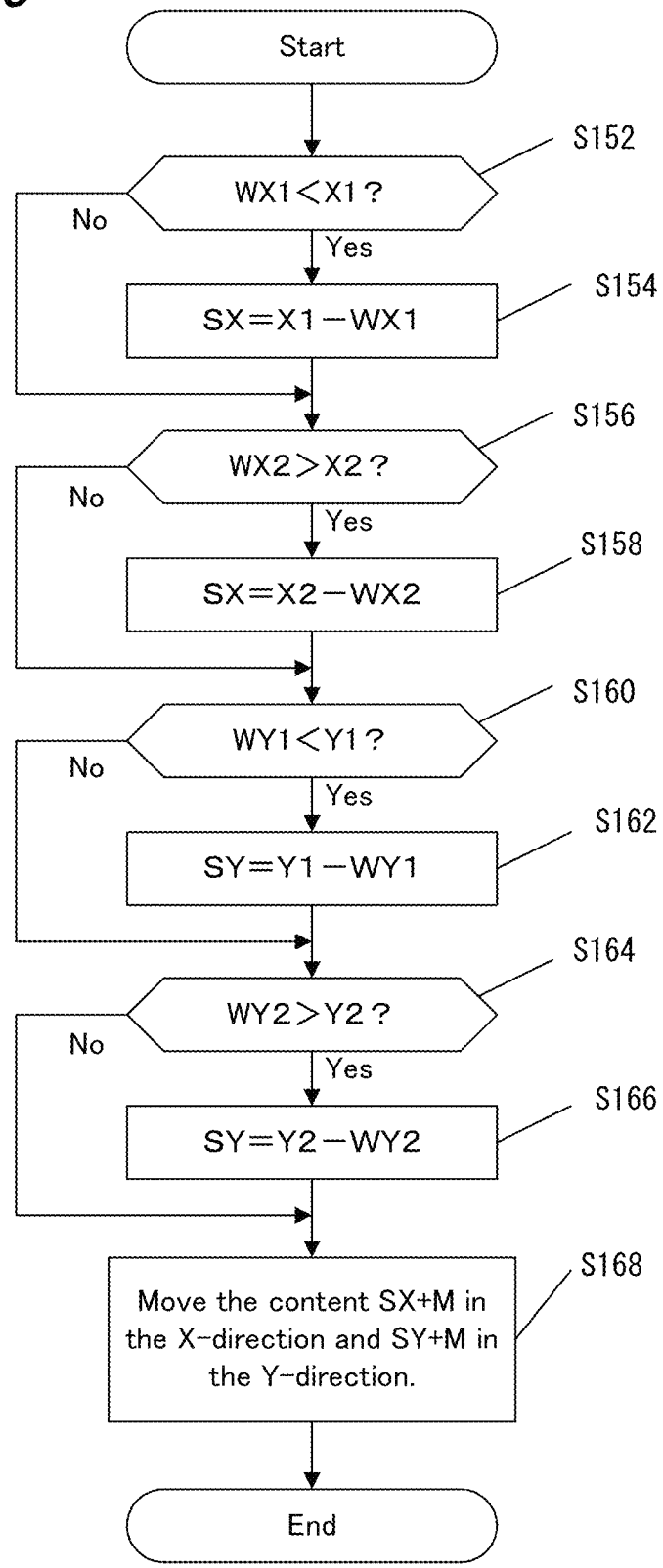
FIG. 5 is a chart for illustrating the processing flow in the first embodiment.

One example of the process in this embodiment will be described referring to FIG. 5. First, when the coordinate WX1 is smaller than X1, X1−WX1 is set as a coordinate quantity SX by which the content is to be shifted along the X-axis (FIG. 4) (Step S152; Yes→Step S154).

Next, when the coordinate WX2 is greater than X2, X2−WX2 is set as a coordinate quantity SX by which the content is to be shifted (Step S156; Yes→Step S158).

Subsequently, when the coordinate WY1 is smaller than Y1, Y1−WY1 is set as a coordinate quantity SY by which the content is to be shifted along the Y-axis (FIG. 4) (Step S160; Yes→Step S162).

Further, when the coordinate WY2 is greater than Y2, Y2−WY2 is set as a coordinate quantity SY by which the content is to be shifted by which the content is to be shifted (Step S164; Yes→Step S166).

Then, the content is moved. At this time, a margin value M may be set. For example, when the content is positioned in proximity to the boundary of the displayable area, the margin value M may be set at '0', whereas when the content is wanted to be placed with a margin, the value may be set at '10' or the like.

Then, the content is moved SX+M in the X-axis direction and SY+M in the Y-axis direction. As a result, the content is displayed within the displayable area.

1.4 Operation Example

Figure 6A:
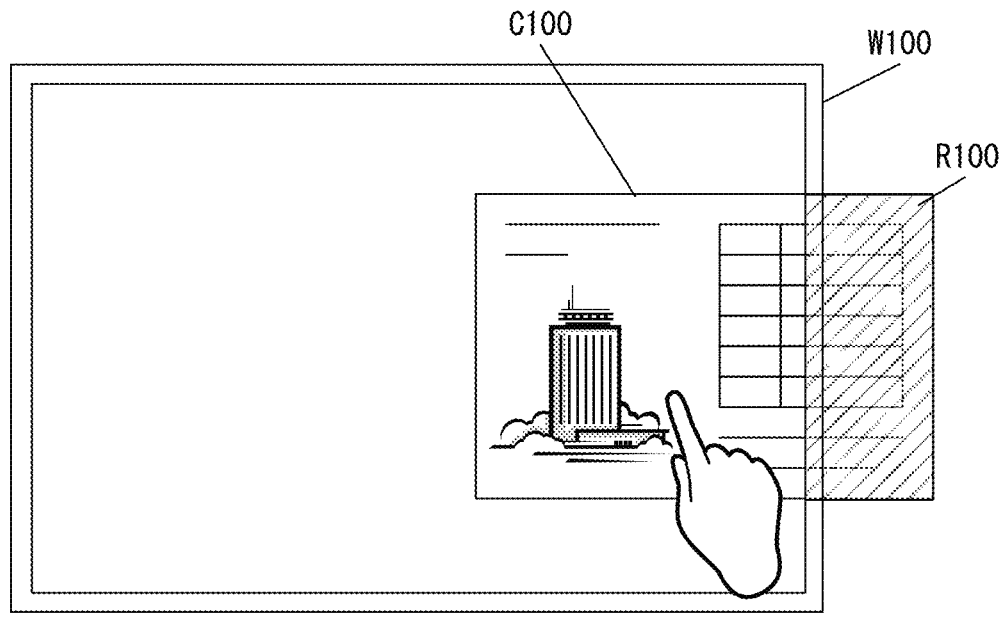
FIGS. 6A and 6B are diagrams for illustrating an operation example in the first embodiment.

Next, an operation example of actual operation will be described with reference to FIGS. 6A and 6B. FIG. 6A shows a display screen W100 on which a content C100 is displayed. In this case, an area R100 in the content C100 is not displayed on the screen. That is, the content is displayed on an area including also an outside (virtual area) of the displayable area.

Figure 6B:
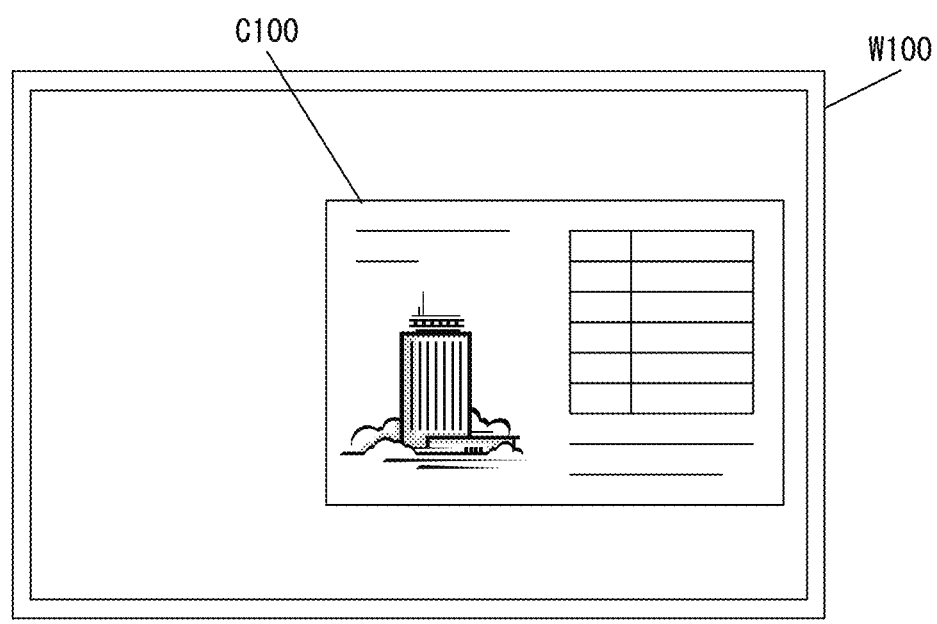

In this condition, when the user touches the content C100 being displayed in the display screen W100, the content C100 moves into the displayable area as shown in FIG. 6B. In this way, it is possible to appropriately display the entire of the content within the displayable area by a simple operation such as touch to a content.

In the conventional configuration, an operation button is displayed, for example, on a right side of the content in the displayed condition shown in FIG. 6A, and there occurs the problem that the operation button cannot be operated properly when the operation buttons are positioned outside the displayable area. According to the present embodiment, even in such a case, the content can be readily moved so that the user can easily operate the operation button.

2. The Second Embodiment

Next, the second embodiment will be described. The second embodiment uses the processing flow shown in FIG. 7 instead of the processing flow of FIG. 3 in the first embodiment. Here, the same steps in the processing flow of FIG. 7 as those in the processing of FIG. 3 are allotted with the same reference numerals, and description of them is omitted.

The second embodiment is aimed at making it easy to select either the case where a content is moved or the case where normal operation is performed (when a content is selected) based on the touch operation.

Figure 7:
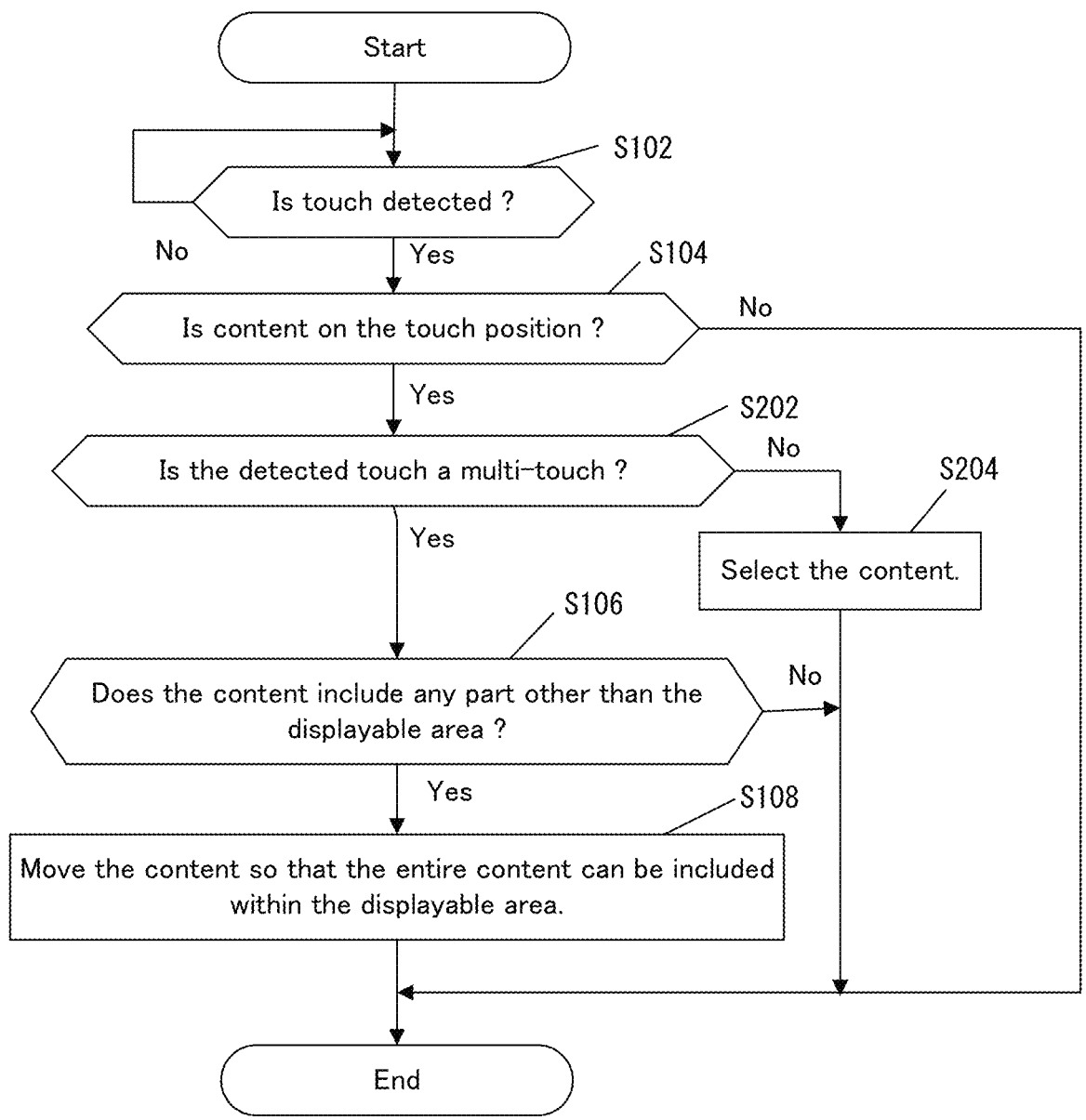
FIG. 7 is a chart for illustrating the processing flow in the second embodiment.

Specifically, as shown in FIG. 7, when the user touches the screen and the detected user's touch (operation) is multipoint-touch (a touch operation at two or more points), the content is moved if the content is displayed beyond the displayable area (Step S202; Yes→Step S106; Yes→Step S108).

On the other hand, when the detected touch is a normal touch operation (touch at a single point), a process in which the content is simply selected is performed (Step S202; No→Step S204).

In this way, according to the present embodiment, it is possible to distinguish the process of automatically shifting a content and displaying the content in the displayable area over the other processes, based on the touch operation to be requested to the user. Accordingly, it is possible to avoid the movement of the content when the user has not intended.

As a variational example of this embodiment, the detecting process at Step S202 in the processing flow of FIG. 7 for determining whether or not the detected operation is a multi-touch may be replaced by a detecting process of determining whether or not the detected operation is a double tap (an operation tapping the screen quickly twice at a particular point). This case can also produce the same effect as the present embodiment does.

3. The Third Embodiment

Next, the third embodiment will be described. The third embodiment uses the processing flow shown in FIG. 8 instead of the processing flow of FIG. 3 in the first embodiment. Here, the same steps in the processing flow of FIG. 8 as those in the processing of FIG. 3 are allotted with the same reference numerals, and description of them is omitted.

The third embodiment is aimed at making it easy to select either the case where a content is moved or the case where normal operation is performed (the case where a content is selected) when the user performs a touch operation.

Figure 8:
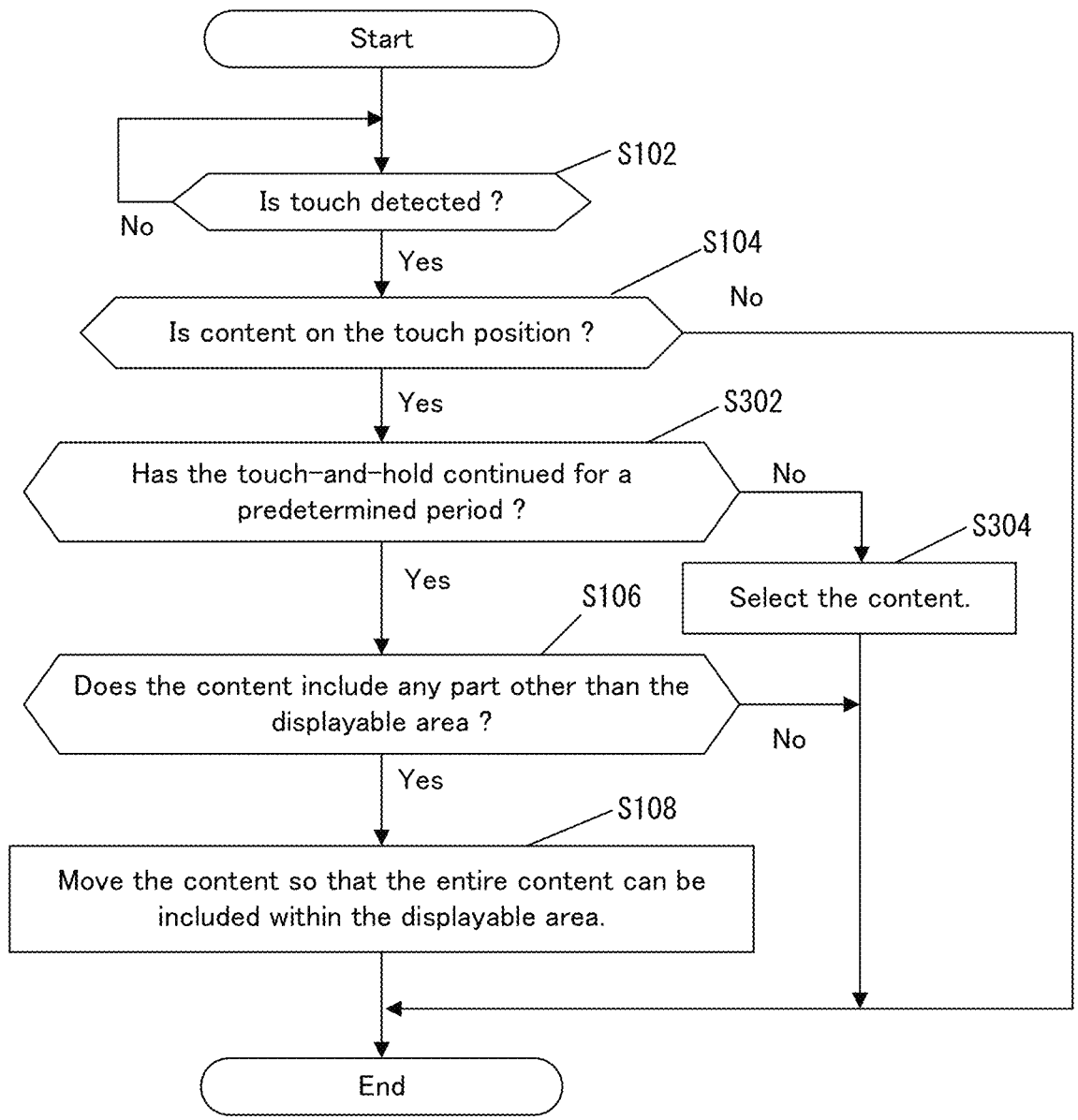
FIG. 8 is a chart for illustrating the processing flow in the third embodiment.

Specifically, as shown in FIG. 8, when the user touched the screen and has continued for a predetermined period or longer than the predetermined period (long pressed), the content is moved if the content is displayed beyond the displayable area (Step S302; Yes→Step S106; Yes→Step S108).

On the other hand, when the detected touch is a normal touch operation (shorter than the predetermined period), performed is a process that the content is simply selected (Step S302; No→Step S304).

In this way, according to the present embodiment, it becomes possible to distinguish the process of automatically shifting a content and displaying the content in the displayable area from the other processes, based on the touch operation to be requested to the user. Accordingly, it becomes possible to avoid a movement of the content when the user has not intended.

4. The Fourth Embodiment

Figure 9:
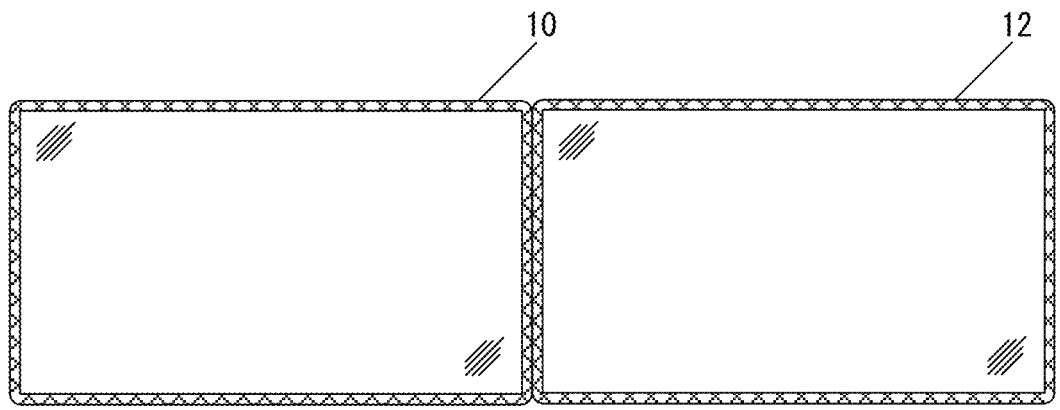
FIG. 9 is an overall appearance view of the fourth embodiment.

Next, the fourth embodiment will be described. The fourth embodiment is an exemplary embodiment of supporting a so-called multi-display where a plurality of display devices are used. That is, as shown in FIG. 9, a display device 10 and a display device 12 are arranged side by side. There are various displaying methods in multi-display, this embodiment will be described on a case where the displayable area is expanded. That is, the displayable area of the display device 10 and the displayable area of the display device 12 are recognized as a single area, which is divided into parts for the individual display devices.

Figure 10:
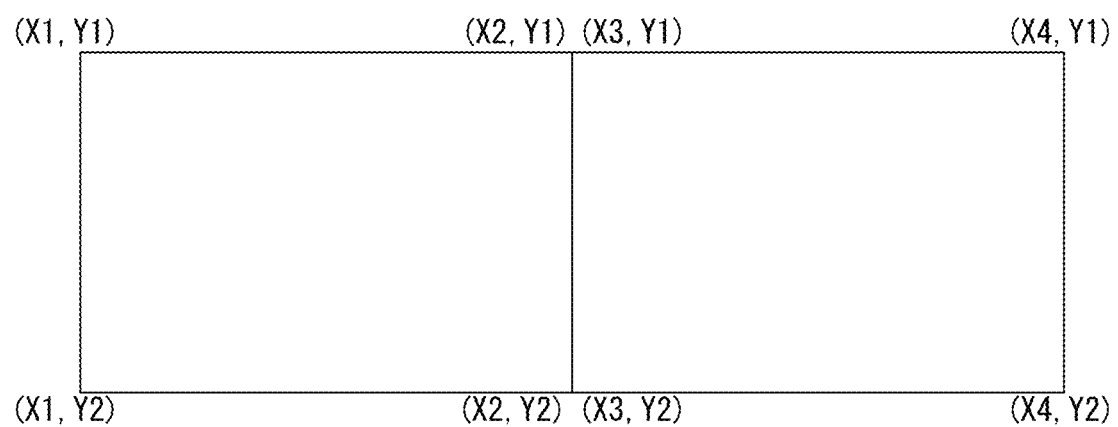
FIG. 10 is a diagram for illustrating coordinates in the fourth embodiment.

For example, as shown in FIG. 10, the displayable area of the display device 10 (the first displayable area) is (X1, Y1)-(X2, Y2), and the displayable area of the display device (the second displayable area) is (X3, Y1)-(X4, Y2).

Accordingly, as a whole, a content can be displayed in the displayable area (X1, Y1)-(X4, Y2). It should be noted that three or more display devices may be adopted and that the displays may be arranged vertically.

Figure 11:
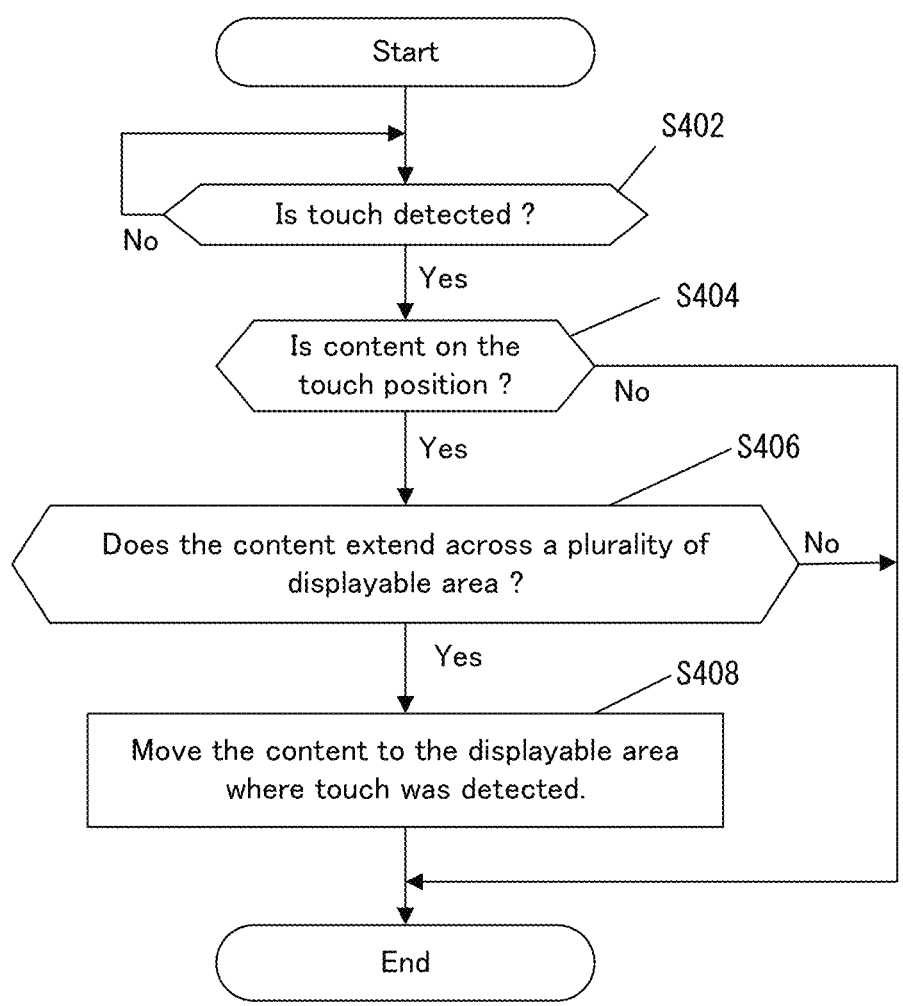
FIG. 11 is a chart for illustrating the processing flow in the fourth embodiment.

Since the functional configurations and the like in the present embodiment are common to the first embodiment, description of them is omitted. As the difference of this embodiment from the first embodiment, the processing flow will be described referring the operation flow shown in FIG. 11. First, a touch is detected (Step S402), it is determined whether or not any content is being displayed at the position (coordinates) where the touch has been done (Step S404).

Here, when a content is displayed at the position where the touch has been made, and when the content is displayed across a plurality of displayable areas (Step S406; Yes), the display area of the content is moved to the displayable area of the display device where the touch was detected so that the entire of the display area of the content is included the displayable area (Step S408).

There can be considered various methods to determine whether or not a content is being displayed across multiple displayable areas. For example, when the display coordinate WX1 of a content is included on the first displayable area, it is determined whether or not WX2 is also included on the first displayable area.

If the size of the content (the number of vertical dots and the number of horizontal dots) is known, it is also possible to determine whether or not the content extends across a plurality of displayable areas, from the coordinate of WX1.

Figure 12A:
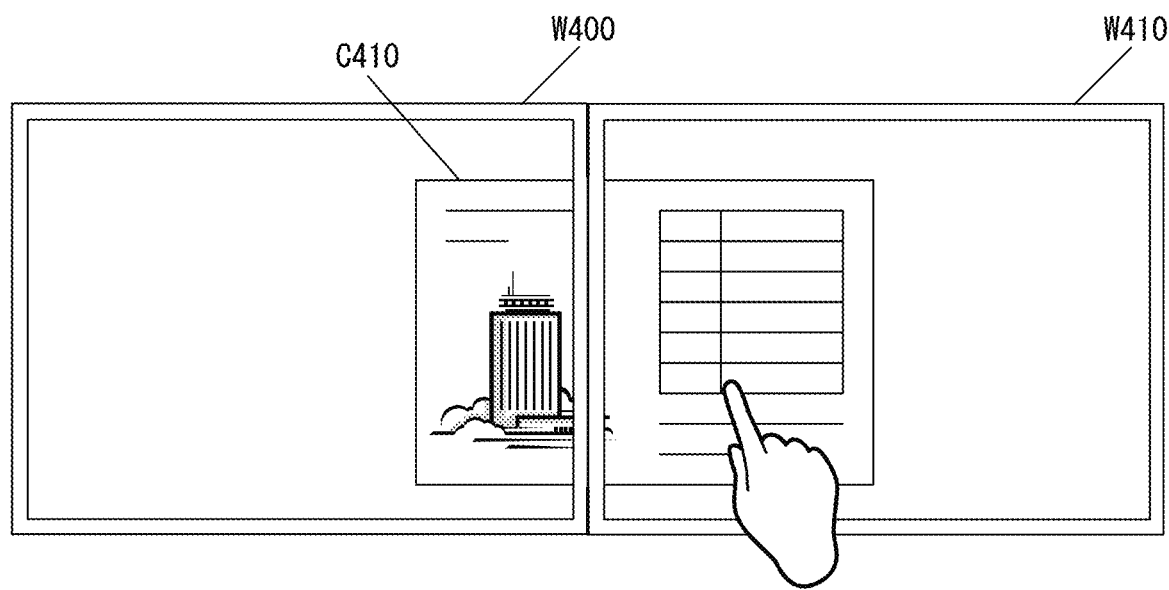
FIGS. 12A and 12B are diagrams for illustrating an operation example in the fourth embodiment.
Figure 12B:
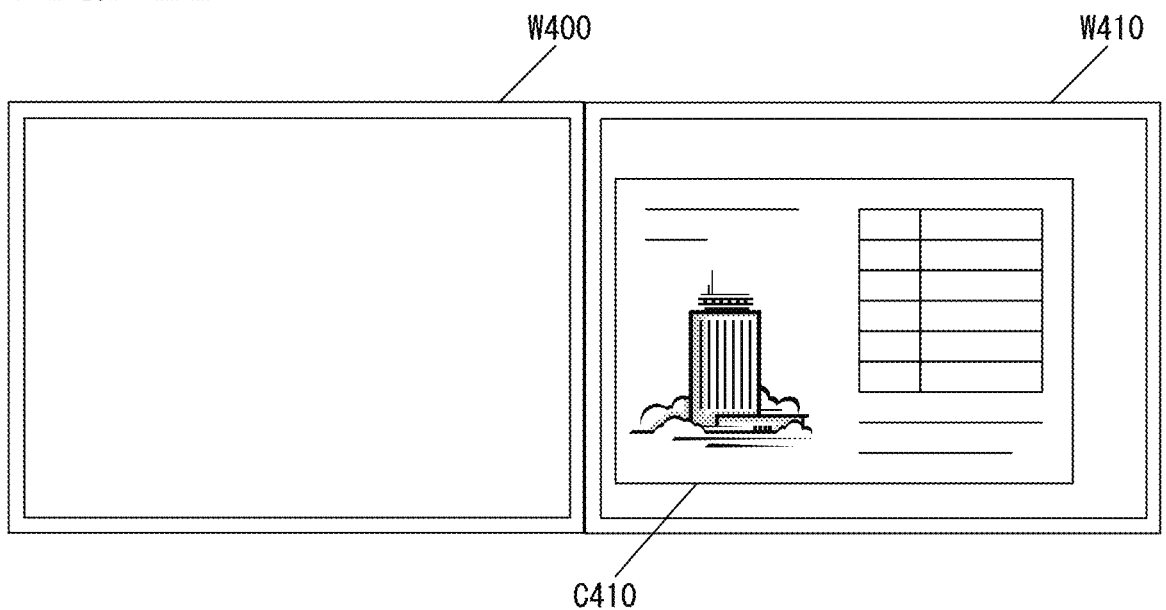

Referring now to FIGS. 12A and 12B, one operation example of the present embodiment will be described. FIGS. 12A and 12B show a pair of display screens W400 (the first displayable area) and W410 (the second displayable area) arranged side by side. On these displays, a content C410 is displayed extending between the display screen W400 and the display screen W410 (FIG. 12A).

Under this condition, a user's touch is detected. The touch position is in the content C410 on the display screen W410.

In this case, the content C410 moves to the display screen W410 side, as shown in FIG. 12B. The process of this movement may use the method described in the first embodiment.

In this way, in a multi-display environment, it is possible to move and display a content easily to the desired display side by the user's touch on the content.

5. The Fifth Embodiment

Figure 13:
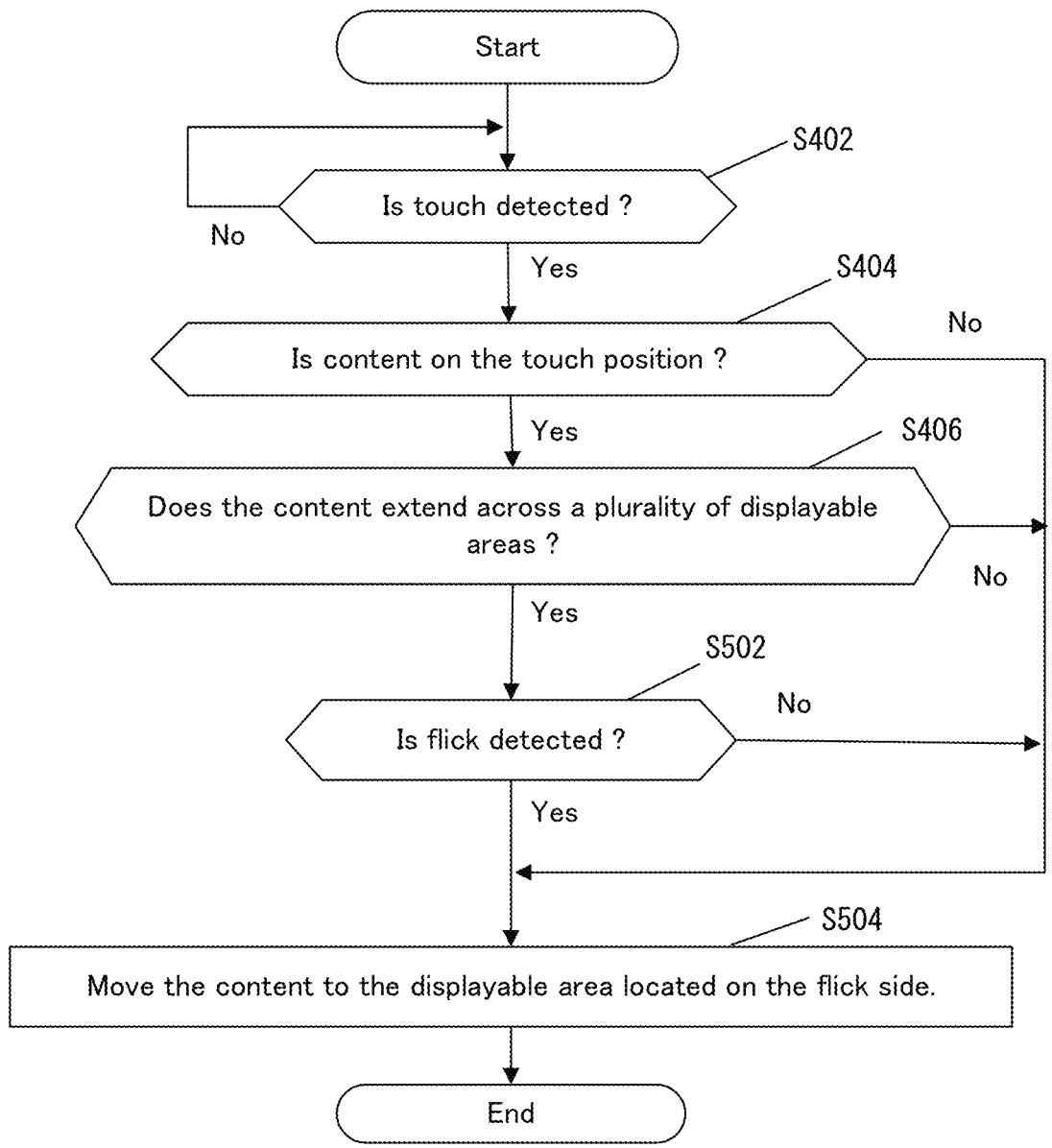
FIG. 13 is a chart for illustrating the processing flow in the fifth embodiment.

Next, the fifth embodiment will be described. The fifth embodiment is an exemplary embodiment in which a flick operation is detected from a touch state. The fifth embodiment uses the processing flow shown in FIG. 13 instead of the processing flow of FIG. 11 in the fourth embodiment. Here, the common steps are allotted with the same reference numerals, so that description of them is omitted.

When the content residing around the touch position extends over a plurality of displayable areas (Step S406; Yes), it is detected whether or not there is a flick operation (Step S502).

When a flick operation is detected, the content is moved to the displayable area residing in a flick direction (Step S502; Yes→Step S504).

Figure 14A:
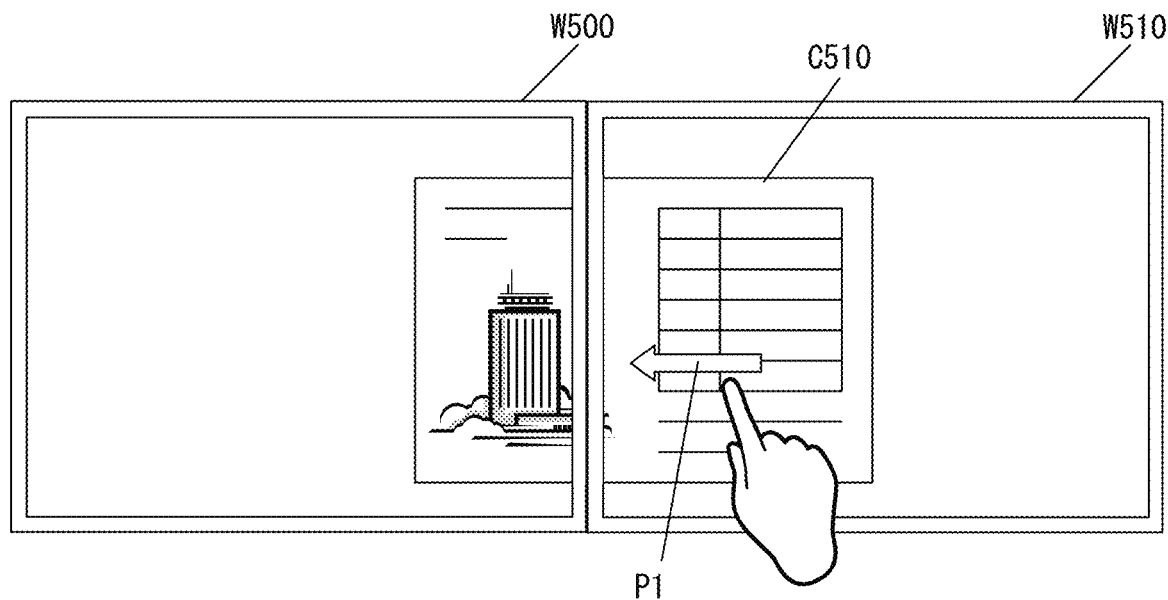
FIGS. 14A and 14B are diagrams for illustrating an operation example in the fifth embodiment; and, FIG. 15 is a chart for illustrating the processing flow in the sixth embodiment.
Figure 14B:
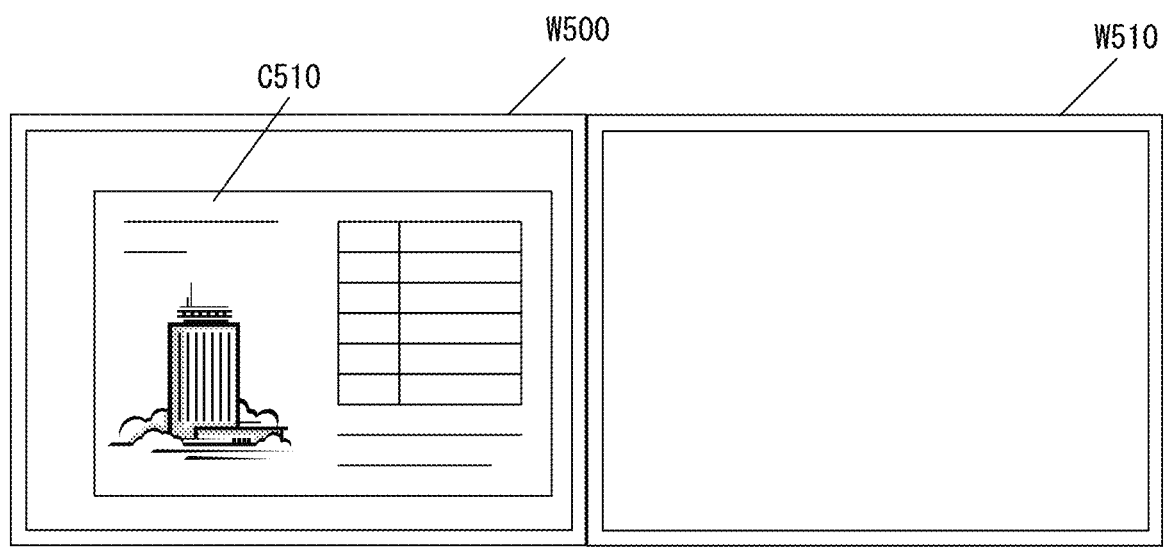

FIGS. 14A and 14B show the operation example of this case. In FIG. 14A, a content C510 is displayed extending between a display screen W500 (the first displayable area) and a display screen W510 (the second displayable area).

In this case, the user touches the content C510 and performs a flick operation in a direction P1. As a result, the content C510 moves so that the entire content C510 is displayed on the display screen W500, as shown in FIG. 14B.

In this way, according to the present embodiment, it is possible to move a content that extends across a plurality of displayable areas into the display device (displayable area) located at a position to which the user wants the content to move. In this case, differing from an ordinary flick operation, the entire display area of the content can be definitely moved into a single displayable area.

6. The Sixth Embodiment

Figure 15:
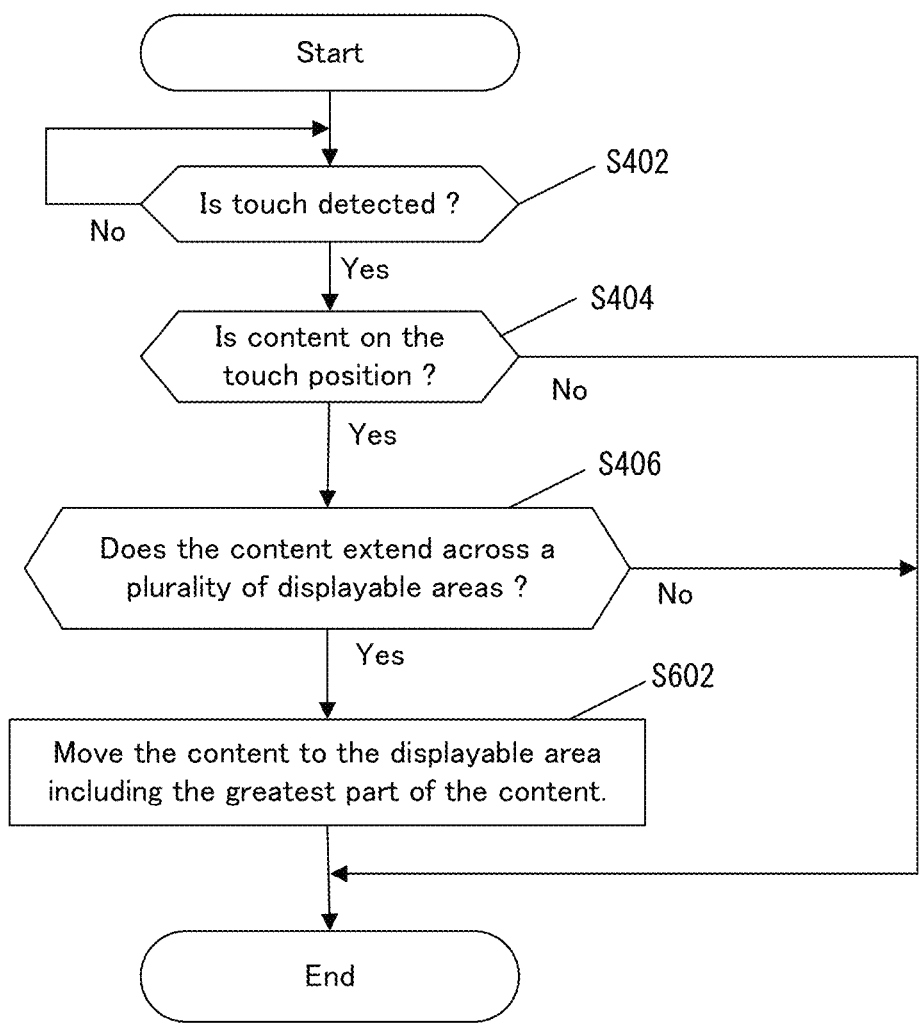

Next, the sixth embodiment will be described. The sixth embodiment uses the processing flow shown in FIG. 15 instead of the processing flow of FIG. 11 in the fourth embodiment. Here, the same steps as those in the fourth embodiment are allotted with the same reference numerals, and description of them is omitted.

When the content including the touch position is extended across a plurality of displayable areas (Step S406; Yes), the display of the entire content is moved into a displayable area of the display screen that includes the greatest display proportion of the content (Step S602).

When, for example, a content is displayed extending between two displays with 80% of the content in the first displayable area and 20% in the second displayable area, the content is moved to the first displayable area wherever the content has been touched.

As a result, the user can pertinently move and display a content with the minimum shift, without caring the touch position.

7. Variational Examples

As the embodiments of this invention have been detailed with reference to the drawings, the specific configuration should not be limited to these embodiments. Designs and others that do not depart from the gist of this invention should also be included in the scope of claims.

Also, it goes without saying that the present invention can be achieved by combination of the above embodiments. For example, by using a flick operation in the fifth embodiment as a trigger in combination with the second embodiment, it is possible for the user to perform an ordinary flick operation by a single-touch flick operation and perform the operation of the fifth embodiment by a multi-touch flick operation.

The program to be operated in each device of the embodiment may be a program (program that makes a computer function) for controlling a CPU or the like so as to realize the functions of the embodiments described above. The information to be handled in these devices is temporarily stored in temporary memory (e.g., RAM (Random Access Memory) at the time of processing, then is stored into storages such as various kinds of ROM (Read Only Memory) and/or HDDs, and is read out, modified and written in by the CPU, as necessary.

Herein, the recording medium for storing the program may be any of semiconductor mediums (e.g., ROM, non-volatile memory card, etc.), optical recording mediums/magneto optical mediums (e.g., DVD (Digital Versatile Disc), MO (Magneto Optical Disc), MD (Mini Disc), CD (Compact Disc), BD (Blu-ray disc) and the like), magnetic recording mediums (e.g., magnetic tape, flexible disc, etc.), and the like. Further, the functions of the above-described embodiments are not only realized by executing the loaded program, but the functions of the present invention may also be realized in accordance with the instructions of the program being executed in cooperation with an operating system, another application program or the like.

To put the product on the market, the program may be stored on a removable storing medium, or may be transferred to a server computer by way of a network such as the Internet or the like. In this case, it goes without saying that the storage device of the server computer is also included in the present invention.

Further, the whole or part of each device in the above-described embodiments may also be typically realized by an LSI (Large Scale Integration) as an integrated circuit. The functional block of each device may be given individually in the form of a chip, or the whole or part may be integrated into a chip. The method of circuit integration may be realized in the form of a dedicated circuit or general purpose processing unit, not limited to LSI. It goes without saying that if a technology of circuit integration replacing LSI technologies appears with the progress of semiconductor technologies, the integrated circuit based on that technology can also be used.

DESCRIPTION OF REFERENCE NUMERALS 10, 12: display device
110: control unit
120: operation detecting unit
130: display unit
140: storage

What is claimed is:

1. A display apparatus comprising:
a display for displaying content;
a processor; and
a memory that stores a program that causes the processor to control the display apparatus, wherein
in a case where a part of the content is outside a displayable area of the display and a position of a touch operation detected in the displayable area is on the content, the processor moves and displays the content so that an entire of the content is displayed on an end in the displayable area where the touch operation is detected, and
the processor determines a movement amount of the content displayed on the displayable area based on the difference between the coordinates of the displayable area and the coordinates of the area of the content, moves the entire of the content by the movement amount, and displays the entire of the content in proximity to the end in the displayable area of the display.

2. The display apparatus according to claim 1, wherein the touch operation is at least one of a tap, double-tap, multipoint-touch, long pressed, or flick operation.

3. The display apparatus according to claim 2, wherein when the touch operation is a normal touch operation, the processor operates the content, and when the touch operation is the multi-point touch operation, the processor moves and displays the entire of the content.

4. The display apparatus according to claim 2, wherein when the touch operation is a single-tap operation, the processor operates the content, and when the touch operation is the double-tap operation, the processor moves and displays the entire of the content.

5. The display apparatus according to claim 1, wherein
The processor determines whether the content is outside the displayable area of the display by comparing the coordinates of the displayable area with the coordinates of the area of the content.

6. The display apparatus according to claim 5, wherein
The processor determines whether or not any of the coordinates indicating a display area of the content is outside the displayable area of the display.

7. The display apparatus according to claim 1, wherein
the movement amount is an amount of the difference between the coordinates of the displayable area and the coordinates of the area of the content or an amount obtained by adding a margin value to the difference between the coordinates of the displayable area and the coordinates of the area of the content.

8. The display apparatus according to claim 1, wherein
the processor moves and displays the content so that an entire of the content is displayed on an end in the displayable area while the displaying size of the content is maintained.

9. A display method of a display apparatus, the display method comprising:
displaying content on a display,
in a case where a part of the content is outside a displayable area of the display and a position of a touch operation detected in the displayable area is on the content, moving and displays the content so that an entire of the content is displayed on an end in the displayable area where the touch operation is detected, and
determining a movement amount of the content displayed on the displayable area based on the difference between the coordinates of the displayable area and the coordinates of the area of the content, moving the entire of the content by the movement amount, and displaying the entire of the content in proximity to the end in the displayable area of the display.

10. A non-transitory recording medium storing a program that causes a computer mounted on a display apparatus to execute a process comprising:
displaying content on a display,
in a case where a part of the content is outside a displayable area of the display and a position of a touch operation detected in the displayable area is on the content, moving and displays the content so that an entire of the content is displayed on an end in the displayable area where the touch operation is detected, and
determining a movement amount of the content displayed on the displayable area based on the difference between the coordinates of the displayable area and the coordinates of the area of the content, moving the entire of the content by the movement amount, and displaying the entire of the content in proximity to the end in the displayable area of the display.

* * * * *